US007135514B2

(12) United States Patent
Johansson

(10) Patent No.: US 7,135,514 B2
(45) Date of Patent: Nov. 14, 2006

(54) ZINC DIACRYLATE PREDISPERSED IN HIGH-CIS POLYBUTADIENE

(75) Inventor: Anders H. Johansson, Yardley, PA (US)

(73) Assignee: Rhein Chemie Corporation, Trenton, NJ (US)

( * ) Notice: Subject to any disclaimer, the term of this patent is extended or adjusted under 35 U.S.C. 154(b) by 284 days.

(21) Appl. No.: 10/281,805

(22) Filed: Oct. 28, 2002

(65) Prior Publication Data

US 2004/0082695 A1 Apr. 29, 2004

(51) Int. Cl.
*C08K 5/09* (2006.01)
*C08K 5/01* (2006.01)
*C08K 5/098* (2006.01)
*C08J 3/20* (2006.01)

(52) U.S. Cl. ...................... 524/321; 524/399; 524/490; 523/351

(58) Field of Classification Search ................ 524/397, 524/433, 372, 371, 34, 435, 399, 321, 490; 523/219, 351; 473/371, 372
See application file for complete search history.

(56) References Cited

U.S. PATENT DOCUMENTS 5,714,545 A * 2/1998 Lee et al. .................. 525/193
5,998,506 A 12/1999 Nesbitt ...................... 523/219
6,218,453 B1 4/2001 Boehm et al. .............. 524/433
6,652,392 B1 * 11/2003 Higuchi et al. ............ 473/374
6,746,345 B1 * 6/2004 Higuchi et al. ............ 473/371
2003/0139532 A1 7/2003 Kataoka .................... 525/274

* cited by examiner

*Primary Examiner*—Tae H. Yoon
(74) *Attorney, Agent, or Firm*—Jennifer R. Seng

(57) ABSTRACT

The present invention provides a method and product that provides a dust-free homogeneous dispersion of zinc diacrylate in polybutadiene for use in golf balls. More specifically, the invention relates to a dispersion of zinc diacrylate in a special high-cis grade of polybutadiene commonly used by golf ball manufacturers. We have found that such a dispersion of ZDA can be made by using specific processing promoters, which not only allow the manufacture of the predispersion, but have a beneficial effect on the final properties of the golf ball. The processing promoters of the present invention enable more uniform dispersion of the ZDA into the polymer matrix, eliminate sticking to the mixer rotors, provide improved extrusion and pelletizing rates, as well as function as a separant to greatly minimize, if not totally eliminate, massing of the pelletized product. This dust-free pelletized product, which can optionally be supplied in slab form, is then sold to the golf ball manufacturer for direct addition to his mixer. The presence of the processing promoter also assists in the mixing of the product into the final golf ball compound as well as improve downstream processing, such as extruding.

22 Claims, No Drawings

ZINC DIACRYLATE PREDISPERSED IN HIGH-CIS POLYBUTADIENE

FIELD OF THE INVENTION

This invention relates to a method and product that provides a dust-free homogeneous dispersion of zinc diacrylate in polybutadiene for use in golf balls.

BACKGROUND OF THE INVENTION

Most modern golf balls are based on peroxide cured polybutadiene. The co-agent of choice for this application is zinc diacrylate (ZDA).

Golf balls are available as solid and wound balls. Solid golf balls, which have all but replaced wound golf balls, provide maximum durability and distance. These balls have a core formed of a solid sphere of one or more layers. Typically, these balls have hard cores for high initial velocity and hard covers for low spin and durability.

A number of polymers, such as polybutadiene, natural rubber, styrene-butadiene, and isoprene, can be used in fabricating the solid cores. Today, solid core golf balls are predominantly made of high-cis polybutadiene. Moreover, in order to obtain the desired physical properties for golf balls, manufacturers have added cross-linking agents, such as metallic salts of an unsaturated carboxylic acid. The amount of cross-linking agent added is typically about 20 to 50 parts per hundred parts of polybutadiene. Most commonly, zinc diacrylate or zinc dimethacrylate are used for this purpose. Of these two cross-linkers, zinc diacrylate has been found to produce golf balls with greater initial velocity than zinc dimethacrylate.

For example, U.S. Pat. No. 5,998,506 to Nesbitt discloses a golf ball composition which includes cis 1,4-polybutadiene, an unsaturated polycarboxylic acid, a polymerization agent preferably consisting of dicumyl peroxide, and zinc diacrylate (ZDA) as the coagent.

Also, U.S. Pat. No. 6,218,453 to Boehm, et al. discloses a composition for the manufacture of a low spin golf ball comprising polybutadiene, a metal salt diacrylate, and a free radical initiator.

However, the zinc diacrylate traditionally used in golf ball compositions, displays many undesirable properties. It is in powder form and has a tendency to absorb moisture from the air. This causes it to compact, making dispersion of the ZDA powder into the polybutadiene difficult. The zinc diacrylate sticks to metal surfaces and causes mixing and cleaning problems. In addition, the ZDA powder is very fluffy, difficult to control and is a skin, eye and respiratory irritant. Manufacturers of zinc diacrylate have made the product in situ with zinc stearate in an attempt to reduce the dispersion problems, but these modifications have had little effect on the other physiological properties.

Predispersions of zinc diacrylate in EPDM and HNBR are already commercially available for use in other applications, but these polymers are not acceptable in golf balls.

SUMMARY OF THE INVENTION

The present invention provides for a dispersion of zinc diacrylate in polybutadiene and the process by which it is made. More specifically, the invention relates to a dispersion of zinc diacrylate in a special high-cis grade of polybutadiene commonly used by golf ball manufacturers. We have found that such a dispersion of ZDA can be made by using specific processing promoters, which not only allow the manufacture of the predispersion, but have minimum effect on the final properties of the golf ball. The processing promoters of the present invention facilitate the uniform dispersion of ZDA and polybutadiene without the problems associated with the ZDA powder. As a result, the ZDA dispersion of the present invention is easy to control when being used in the manufacture of golf balls. Since the predispersed form of the ZDA eliminates fly-loss during addition and mixing, reduces total mixing time, and does not stick to the metal rotors of the Banbury mixer, the user realizes greater batch-to-batch consistency resulting in balls with more uniform properties. In addition to allowing for easy clean up, the ZDA dispersion of the present invention does not cause skin, eye, and respiratory irritation as readily and can therefore be considered environmentally friendly.

Various processing promoters have been identified, which when combined with the ZDA and polybutadiene, not only provide improved processibility as described above, but also exhibit better flow properties during extrusion of the product, reduced massing of the pelletized product, faster dispersibility in the customer's compound, and in some cases ultimately co-cure into the compound to have a minimum effect on final properties.

The rubber dispersion composition of the present invention comprises a mixture of a) from about 12 to 50 parts by weight of a polybutadiene based on the total weight of said dispersion; b) from about 50 to 85 parts by weight of zinc diacrylate based on the total weight of said dispersion; and (c) from about 0.5 to 5 parts by weight of a processing promoter selected from the group of low molecular weight polyethylene, fatty acids, zinc salts of fatty acids and mixtures thereof.

DETAILED DESCRIPTION OF THE INVENTION

This invention provides a novel, zinc diacrylate dispersion which can be used in golf ball compositions.

A representative base composition for forming the dispersion of the present invention comprises from 12 to 50 parts by weight of a polybutadiene based on the total weight of the dispersion. Preferably, the polybutadiene is a high-cis polybutadiene, in parts by weight from 12 to 22, and most preferably in parts by weight from 15 to 19 based on the total weight of the dispersion.

The preferred high-cis polybutadiene is neodymium catalyzed and has a cis-1,4 content of above about 90% and more preferably above about 96%. However, any grade of polybutadiene can be used by compensating for the molecular weight differences, using more or less promoter. The preferred grades of polybutadiene are those accepted by the various golf ball manufacturers and are readily available. Commercial sources of polybutadiene include Shell 1220 manufactured by Shell Chemical, Neocis BR40 and Enichem BR 40 manufactured by Enichem Elastomers, Ubepol BR150 manufactured by Ube Industries, Ltd., Buna CB 22, Buna CB 23 and Taktene 1220 manufactured by Bayer Corporation, and Budene 1207 manufactured by Goodyear Chemical. If desired, the polybutadiene can also be mixed with other elastomers known in the art, such as natural rubber, styrene butadiene, and/or isoprene in order to further modify the properties of the core. When a mixture of elastomers is used, the amounts of other constituents in the core composition are generally based on 100 parts by weight of the total elastomer mixture.

Zinc diacrylate is a co-agent preferred for use in golf balls because it provides golf balls with a high initial velocity in the USGA test. The zinc diacrylate of the present invention can be of various grades of purity. Typical grades contain about 90% ZDA and 10% zinc stearate, which is either incorporated in-situ or post added. Suitable, commercially available zinc diacrylates can be obtained from Sartomer Company.

The preferred concentrations of the commercially available zinc diacrylate grades that can be used in this invention are from about 88 to 92 percent by weight zinc diacrylate and 8 to 12 percent zinc salts of fatty acids, preferably zinc stearate.

The processing promoters of the present invention enable more uniform and faster dispersion of the ZDA into the polymer matrix, eliminate sticking to the mixer rotors, provide improved extrusion and pelletizing rates, as well as function as a separant to greatly minimize, if not totally eliminate, massing of the pelletized product. The resulting dust-free pelletized product, which can optionally be supplied in slab form, is then sold to the golf ball manufacturer for direct addition to his mixer. The presence of the processing promoter also assists in the mixing of the product into the final golf ball compound as well as improve downstream processing, such as extruding.

Preferred processing promoters of the present invention are low molecular weight polyethylenes (MW approximately 800–2500) exemplified by Aflux PE 11, AC-617A and AC-1702; and fatty acids (preferably saturated fatty acids), zinc salts of fatty acids and combinations thereof exemplified by Aktiplast PP. Oleic acid and zinc salts of oleic acid may also be used advantageously in the manufacture of the ZDA dispersion, but may subsequently rob the cure of the golf ball composition.

The preferred concentrations of processing promoter that can be used are from 0.5 to 5 parts by weight based on the total weight of the said dispersion.

The ZDA dispersion of the present invention is made in an internal mixer into which is first added the total amount of polymer, some dispersion from a previous batch, all of the processing promoter, and all of the ZDA powder. The mixed batch is discharged at a mixer temperature of 200° F. (93° C.). The temperature of the batch obtained using a thermocouple is generally about 20° F. higher. The mix temperature is a compromise between being high enough to melt the processing promoters and optionally to melt and disperse low-melt bags if desired, and low enough to minimize odor, undesired reactions and even decompositions.

Since ZDA poses a dust explosion hazard, all appropriate precautions are taken in the mixing area to minimize risk of a fire or worse. Following the mixing operation, the homogeneous mixture is then pelletized using a dry-face-cutter-head on an extruder. Although pellets are the preferred form for automatic weighing, a slabbed version is also available by using a slot-die on the extruder. The mixing and forming processes used to make this product would be known to anyone versed in the art of mixing, but the process of mixing all the ingredients at once and the inclusion of previously mixed material is a material improvement to the process that shortens the total mixing time of the product.

EXAMPLES

SBR 1506: A 23.5% bound styrene emulsion SBR with an ML(1+4)100° C. of 25 from DSM Copolymer.

Buna CB 23: A Neodymium catalyzed high-cis polybutadiene from Bayer.

Aflux PE 11: A blend of polymer olefin and polyethylene wax having a softening point around 112° C., commercially available from Rhein Chemie Corporation.

ZN-DA 90S: A zinc diacrylate having a density of 1.38 and an ML(1+4)100° C. of 35, commercially available from Nippon Shokubai.

SR 706: Powdered zinc diacrylate from Sartomer Company, Inc.

Taktene 1220: A Cobalt catalyzed high-cis polybutadiene from Bayer.

Aktiplast PP: A blend of zinc salts of mainly saturated fatty acids having a density of 1.08 g/cc and a softening point about 100° C. from Rhein Chemie Corporation.

A-C 617A Polyethylene: a low molecular weight polyethylene having a density of 1.33 and an ML(1+4)100° C. of 37 which is commercially available Honeywell Specialty Chemicals.

A-C Polyethylene 1702: a low molecular weight polyethylene with a softening point around 85° C., which is commercially available from Honeywell Specialty Chemicals.

Example 1

The rolls of a standard 12-inch two-roll laboratory mill were warmed to about 150° F. by masticating some SBR 1506 for a few minutes. After the rolls were warm and the SBR 1506 removed, the Buna CB 23 was added. After a continuous polymer band had been formed, the processing promoter Aflux PE 11 was added and dispersed into the rubber. At this point, the zinc diacrylate as SR 706 was added. Mixing continued until a homogeneous mixture was obtained. The total procedure took about 10 minutes. The batch was easily and completely removed from the mill.

Using the above procedure, three batches were consecutively made containing 70, 75 and 80% SR 706. The exact composition and physical properties of those batches are presented below in Table 1:

TABLE 1

| % ZDA | SR706 | BUNA CB 23 | Aflux PE 11 | Density Grams/cc | ML(1 + 4) 100° C. Lb-in | ML(1 + 4) 50° C. Lb-in |
|---|---|---|---|---|---|---|
| 70 | 700 g | 262.5 g | 37.5 g | 1.29 | 38 | 97 |
| 75 | 750 g | 218.75 g | 31.25 g | 1.33 | 43 | 117 |
| 80 | 800 g | 175.0 g | 25.0 g | 1.38 | 55 | 200+ |

Example 2

The same procedure described in Example 1 was used to make a product with the composition 60% SR 706, 35% Taktene 1220 and 5% Aflux PE 11. This homogeneous composition had a density of 1.22, an ML(1+4)100° C. of 23 and an ML(1+4)50° C. of 76.

Example 3

The same procedure described in Example 1 was used to make a product with the composition 80% ZN-DA 90S,17% Buna CB 23 and 3% Aflux PE 11.

Example 4

The same procedure described in Example 1 was used to make a product with the composition 80% SR 706, 17% Buna CB 23 and 3% Aktiplast PP.

Example 5

The same procedure described in Example 1 was used to make a product with the composition 75% SR 706, 21.9% Buna CB 23 and 3.1% A-C 617A Polyethylene.

Example 6

The rotors of a Farrell BR laboratory Banbury were warned by masticating some SBR 1506. When the temperature probe on the Banbury indicated about 150° F., the SBR 1506 was removed. Into the warm Banbury was first added 329 grams of Buna CB 23 followed by 45 grams of A-C Polyethylene 1702 and 1125 grams of SR 706. The A-C Polyethylene 1702 is a product of Honeywell Specialty Chemicals and is described as a low molecular weight polyethylene with a softening point around 85 C. The composition was mixed to a dump temperature of 200 F. The homogeneous composition had a measured density of 1.39, an ML(1+4)100° C. of 29 and an ML(1+4)50° C. of 98.

Example 7

Commercial size quantities of the zinc diacrylate dispersion product can be made in a 3D Banbury. All of the Buna CB 23, all of the Aflux PE 11 and one-half the amount of zinc diacrylate is charged to the Banbury in that order. After the addition of those ingredients, the clock is set at "0". After approximately 20 seconds, the ram is lowered. At approximately 2 minutes, the ram is raised and the remaining half of the zinc diacrylate is added and the ram lowered. After about a minute, the ram is raised, but no scraping is involved. After about another minute, the ram is lowered. At a temperature around 150° F., the ram is raised, the sides scraped and the ram lowered. Mixing is continued with the ram down until the machine temperature reaches 200° F.

The homogeneous mixture is dumped from the Banbury and charged to an extruder where it is pelletized. The pellets are then cooled and packaged.

All of the above mixtures possessed the quality, homogeneity, viscosity, chemical and dispersion characteristics required for use in golf balls.

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A rubber dispersion composition comprising:

a) from about 12 to 50 parts by weight of a polybutadiene based on the total weight of said dispersion;

b) from about 50 to 85 parts by weight of zinc diacrylate based on the total weight of said dispersion; and c) from about 0.5 to 5 parts by weight of a processing promoter selected from the group consisting of low molecular weight polyethylene, fatty acids, zinc salts of fatty acids and mixtures thereof.

2. A composition according to claim 1, wherein said polybutadiene is a high- cis-polybutadiene.

3. A composition according to claim 1, wherein said dispersion comprises from 12 to 22 parts by weight of said polybutadiene.

4. A composition according to claim 3, wherein said dispersion comprises 15 to 19 parts by weight of said polybutadiene.

5. A composition according to claim 1, wherein said dispersion comprises 70 to 85 parts by weight of zinc diacrylate based on the total weight of said dispersion.

6. A composition according to claim 5, wherein said dispersion comprises 75 to 85 parts by weight of zinc diacrylate based on the total weight of said dispersion.

7. A composition according to claim 1, wherein said processing promoter is a low molecular weight polyethylene having a molecular weight from 750 to 2500.

8. A composition according to claim 1, wherein said processing promoter is a blend of polymer olefin and polyethylene wax having a softening point around 112° C. and is present at 0.5 to 5.0 percent by weight of the total product.

9. A composition according to claim 8, wherein said processing promoter is present at 2.5 to 3.5 percent by weight of the total product.

10. A composition according to claim 1, wherein said processing promoter is a low molecular weight polyethylene with a softening point around 85° C.

11. A composition according to claim 10, wherein said processing promoter is a low molecular weight polyethylene having a density of 1.33 g/cc and an ML(1+4)100° C. of 37.

12. A composition according to claim 1, wherein said processing promoter comprises zinc salts of mainly unsaturated fatty acids.

13. A composition according to claim 1, wherein said processing promoter is a blend of zinc salts of mainly saturated fatty acids having a density of 1.08 g/cc and a softening point about 100° C.

14. A composition according to claim 1, wherein said fatty acid is oleic acid.

15. A composition according to claim 1, wherein said zinc salts of fatty acids is a zinc salt of oleic acid.

16. A process for making a rubber dispersion comprising the steps of:

a) mixing i) from about 12 to 50 parts by weight of a polybutadiene based on the total weight of said dispersion; ii) from about 50 to 85 parts by weight of zinc diacrylate based on the total weight of said dispersion; and iii) from about 0.5 to 5 parts by weight of a processing promoter selected from the group consisting of low molecular weight polyethylene, fatty acids, zinc salts of fatty acids and mixtures thereof to form a homogeneous mixture;

b) extruding said homogeneous mixture; and then c) pelletizing or slabbing said extruded homogeneous mixture.

17. A process according to claim 16, wherein said polybutadiene is a high- cis-polybutadiene.

18. A process according to claim 16, wherein said dispersion comprises from 12 to 22 parts by weight of said polybutadiene.

19. A process according to claim 18, wherein said dispersion comprises 15 to 19 parts by weight of said polybutadiene.

20. A process according to claim 16, wherein said dispersion comprises 70 to 85 parts by weight of zinc diacrylate based on the total weight of said dispersion.

21. A process according to claim 20, wherein said dispersion comprises 75 to 85 parts by weight of zinc diacrylate based on the total weight of said dispersion.

22. A process according to claim 16, wherein said processing promoter is a low molecular weight having a molecular weight from 750 to 2500 polyethylene.

* * * * *